United States Patent
Castellari et al.

(10) Patent No.: US 10,422,686 B2
(45) Date of Patent: Sep. 24, 2019

(54) CONTAINER WEIGHING UNIT AND METHOD WITH MOVABLE WEIGHING DEVICES

(71) Applicant: GIMA S.p.A., Zola Predosa (Bologna) (IT)

(72) Inventors: Pierluigi Castellari, Castel San Pietro Terme (IT); Mario Palpati, Imola (IT)

(73) Assignee: GIMA S.p.A., Zola Predosa (Bologna) (IT)

( * ) Notice: Subject to any disclaimer, the term of this patent is extended or adjusted under 35 U.S.C. 154(b) by 175 days.

(21) Appl. No.: 15/533,748

(22) PCT Filed: Dec. 14, 2015

(86) PCT No.: PCT/IB2015/059567
§ 371 (c)(1),
(2) Date: Jun. 7, 2017

(87) PCT Pub. No.: WO2016/097958
PCT Pub. Date: Jun. 23, 2016

(65) Prior Publication Data
US 2017/0322070 A1    Nov. 9, 2017

(30) Foreign Application Priority Data

Dec. 15, 2014   (IT) .............................. BO2014A0701

(51) Int. Cl.
*G01G 19/14*    (2006.01)
*G01G 15/00*    (2006.01)
*G01G 17/00*    (2006.01)

(52) U.S. Cl.
CPC ............. *G01G 19/14* (2013.01); *G01G 15/00* (2013.01); *G01G 15/006* (2013.01); *G01G 17/00* (2013.01)

(58) Field of Classification Search
CPC ...... G01G 15/00; G01G 15/006; G01G 17/00; G01G 19/14; G01G 19/18
See application file for complete search history.

(56) References Cited

U.S. PATENT DOCUMENTS 4,146,467 A * 3/1979 Sauer ................. B65G 21/2036
                                                198/380
4,407,379 A * 10/1983 Pryor ..................... G01G 13/04
                                                177/103

(Continued)

FOREIGN PATENT DOCUMENTS

CN        1457318 A      11/2003
CN      201173810 Y      12/2008

(Continued)

OTHER PUBLICATIONS

International Search Report and Written Opinion for corresponding Patent Application No. PCT/IB2015/059567 dated Feb. 23, 2016.

(Continued)

*Primary Examiner* — Randy W Gibson
(74) *Attorney, Agent, or Firm* — Renner, Otto, Boisselle & Sklar, LLP

(57) ABSTRACT

Described is unit for weighing containers (2) comprising a line (4) for transporting the containers (2) extending along a first path (P) which passes through a region (R1) for weighing and provided with a plurality of seats (5) for supporting the containers (2) arranged in succession along the first path (P); a plurality of elements (6) for vertical movement of the containers (2), each configured at the weighing region (R1) to make contact with and move vertically one of the containers (2) so as to place it in a raised position (PS1) disengaged from the corresponding supporting seat (5); a plurality of elements (7) for retaining the containers (2), each configured for retaining one of the containers (2) in the raised position (PS1); a plurality of weighing devices (8), (Continued)

each associated to, and carrying, a retaining element (7) for measuring the weight of a container (2) retained by the retaining element (7).

17 Claims, 6 Drawing Sheets

(56) References Cited

U.S. PATENT DOCUMENTS

| | | | | |
|---|---|---|---|---|
| 5,092,414 | A | | 3/1992 | Blezard |
| 5,193,630 | A | * | 3/1993 | Cane ...................... G01G 15/00 177/145 |
| 5,205,367 | A | * | 4/1993 | Andre ...................... B29C 31/06 177/145 |
| 5,306,877 | A | * | 4/1994 | Tas ............................ B07C 5/18 177/145 |
| 5,725,082 | A | * | 3/1998 | Connell ............... B65G 47/848 198/471.1 |
| 5,740,843 | A | * | 4/1998 | Burkart ................... B65B 43/50 141/1 |
| 6,084,184 | A | * | 7/2000 | Troisi ..................... G01G 15/00 177/145 |
| 6,479,767 | B1 | | 11/2002 | Zicher |
| 6,881,907 | B2 | * | 4/2005 | Winkelmolen ...... B65G 47/766 177/145 |
| 8,704,111 | B2 | * | 4/2014 | Tanaka ................. B25J 15/0616 177/245 |

FOREIGN PATENT DOCUMENTS

| | | |
|---|---|---|
| CN | 101504307 A | 8/2009 |
| CN | 202511857 U | 10/2012 |
| CN | 202793567 U | 3/2013 |
| CN | 103712675 A | 4/2014 |
| DE | 10 2004 035061 A1 | 2/2006 |

OTHER PUBLICATIONS

Search Report for corresponding Italian Patent Application No. BO2014A000701 dated Jun. 11, 2015.
Chinese Office Action for corresponding Chinese Patent Application No. 201580068177.8 dated Dec. 27, 2018.

* cited by examiner

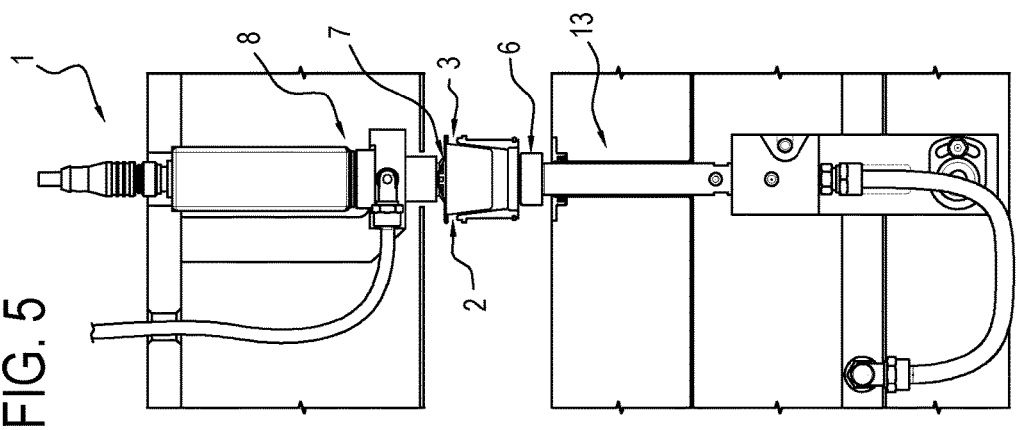
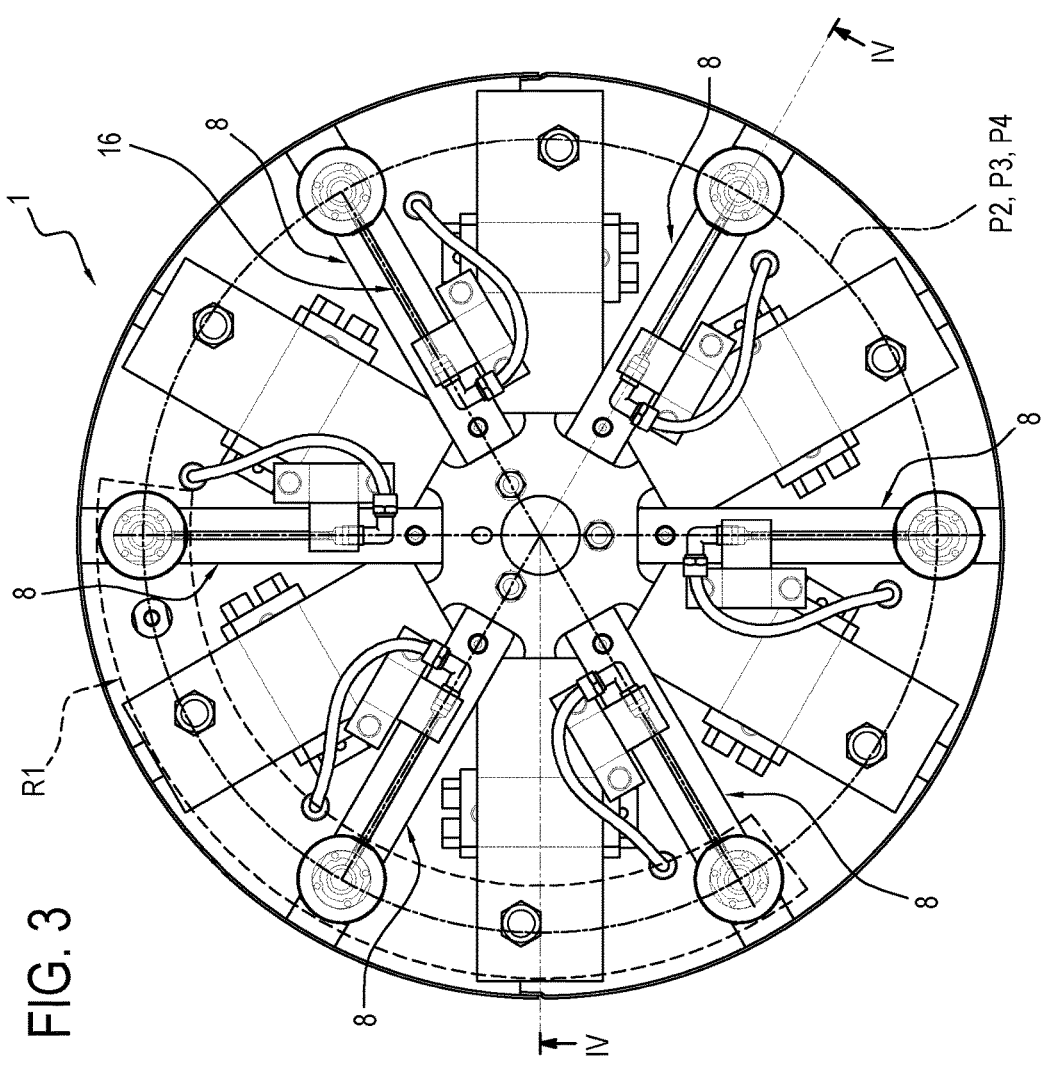

CONTAINER WEIGHING UNIT AND METHOD WITH MOVABLE WEIGHING DEVICES

This application is a national phase of International Application No. PCT/IB2015/059567 filed Dec. 14, 2015 and published in the English language, which claims priority to Italian Patent Application No. BO2014A000701 filed Dec. 15, 2014, which are hereby incorporated herein by reference.

TECHNICAL FIELD

This invention relates to a unit and a method for weighing containers, for example capsules for infusion or extraction products, or vials and bottles for pharmaceutical, cosmetic or food products.

BACKGROUND ART

There are prior art systems for weighing containers which consist of resting the container to be weighed on a plate of a weighing cell and leaving it for a period of time (as a function of the characteristics of the weighing cell and the required accuracy for the measurement), at the end of which the weighed container is moved away towards successive stations/process steps.

In such a weighing system, the containers are moved in step mode and the weighing time between one step and the next. As the weighing time increases, and therefore the accuracy which can be obtained increases, the productivity necessarily falls.

There are also prior art weighing systems which comprise moving the containers continuously and the weight of the containers is measured in an indirect manner by sensors of various types, such as capacitive, microwave, X-ray sensors etc. These indirect weighing systems have the advantage of allowing high productivity, but not equally guarantee measurement precision and accuracy.

In the technical sector of filling capsules for extraction or infusion beverages, the capsules, used in machines for making these beverages, comprise in their simplest form, the following:

- a rigid, cup-shaped container comprising a perforatable or perforated bottom and an upper aperture provided with a rim (and usually, but not necessarily, having the shape of a truncated cone);
- a dose of extraction or infusion beverage product contained in the rigid container;
- a closing piece (or element) obtained from a web for sealing the aperture of the rigid container and designed (usually but not necessarily) to be perforated by a nozzle which supplies liquid under pressure.

Preferably, but not necessarily, the sealing sheet is obtained from a web of flexible material. In some cases, the capsules may comprise one or more filtering elements of the rigid or flexible type.

For example, a first filter (if present) may be located on the bottom of the rigid container. A second filter (if present) may be interposed between the piece of sealing sheet and the product dose.

The capsule made up in this way is received and used in specific slots in machines for making beverages.

Patent document WO2013/121319A1 in the name of the same Applicant as this invention describes a machine for packaging single-use capsules having an element for conveying cup-shaped containers which extends along a closed horizontal path, for conveying the cup-shaped container between the various processing stations, in which cup-shaped container is filled and closed.

The processing stations are positioned along the closed path, for allowing the filling of a rigid, cup-shaped container with a dose of product and closing the container with the closing element.

A strongly felt need in the machine is that of weighing, in a particularly reliable and quick manner, the rigid, cup-shaped containers filled and closed with doses of product.

More specifically, a strongly felt need is that of weighing the rigid, cup-shaped containers filled and closed at high operating speeds, that is to say, without requiring an intermittent operation of the machine.

For this reason, the need has been found of having a unit for weighing closing elements which can be associated with the machine according to patent document WO2013/121319A1.

DISCLOSURE OF THE INVENTION

The aim of this invention is therefore to provide a unit and a method for weighing containers, for example containers defining capsules for extraction or infusion beverages, such as, for example, coffee, tea, chocolate or combinations of these ingredients, or bottles and vials for pharmaceutical, cosmetic, or food products, which are particularly reliable and precise and which allow a particularly high productivity to be maintained.

These aims are fully achieved by the unit for feeding and weighing containers comprising the technical features described in one or more of the appended claims.

BRIEF DESCRIPTION OF THE DRAWINGS

The technical characteristics of the invention, with reference to the above aims, are clearly described in the claims below and its advantages are apparent from the detailed description which follows, with reference to the accompanying drawings which illustrate a preferred embodiment of the invention provided merely by way of example without restricting the scope of the inventive concept, and in which:

FIG. 3 illustrates a plan view of the weighing unit for extraction or infusion beverages according to this invention;

FIG. 5 illustrates a partial front view of the weighing unit according to this invention;

DETAILED DESCRIPTION OF PREFERRED EMBODIMENTS OF THE INVENTION

A preferred embodiment of the invention will now be illustrated, referred to single-use capsules containing extraction or infusion products.

It is understood that the invention may be advantageously applied to the weighing of objects in general, such as containers, including, merely by way of an example, vials and bottles for use in the pharmaceutical, cosmetic, food sectors etc.

With reference to the accompanying drawings, the numeral 1 denotes a unit for weighing containers 2, in particular cup-shaped containers 2 defining capsules 3 for extraction or infusion beverages for a machine 100 for packaging capsules 3 containing products for extraction or infusion beverages such as coffee, tea, milk, chocolate or combinations of these ingredients.

Figure 1:
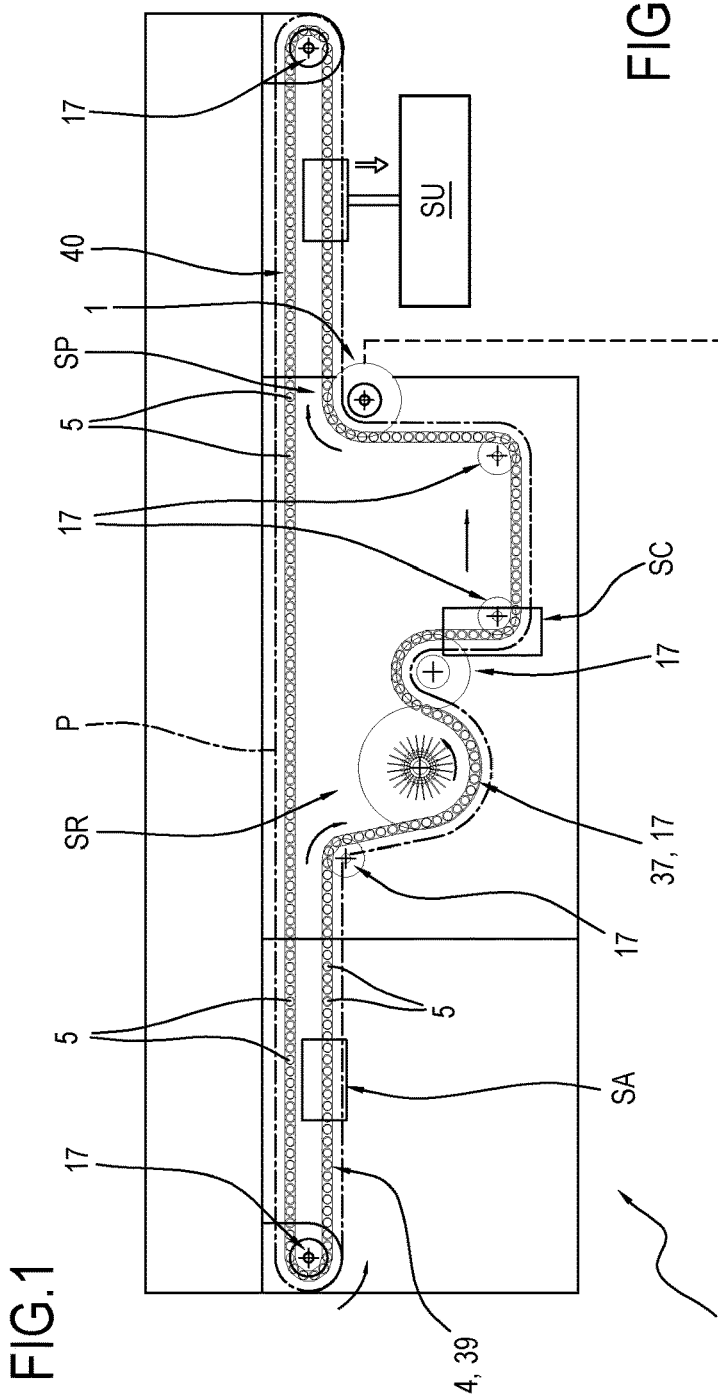
FIG. 1 illustrates a machine for packaging single-use capsules for extraction or infusion beverages in which the weighing unit according to the invention is used.
Figure 2:
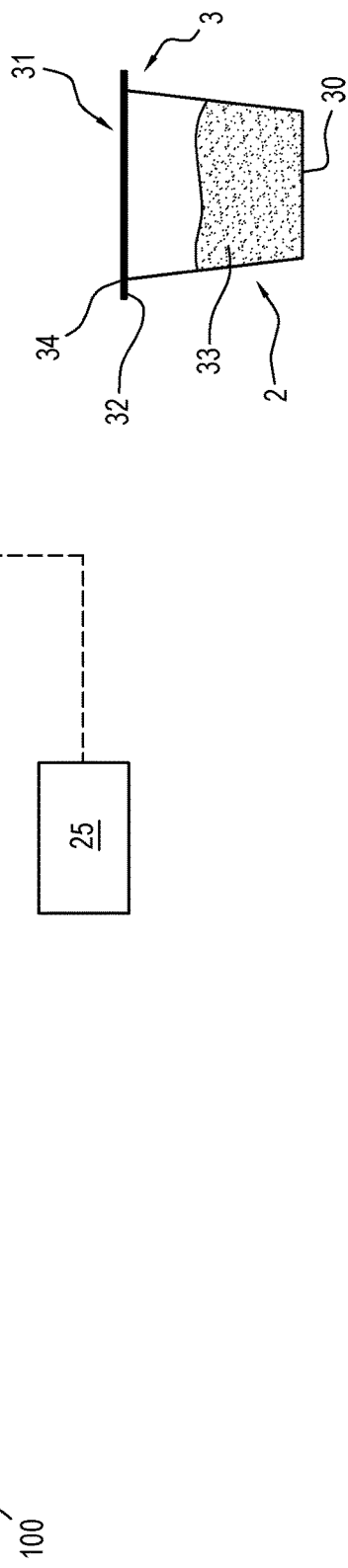
FIG. 2 illustrates a single-use capsule for extraction or infusion beverages.
Figure 4:
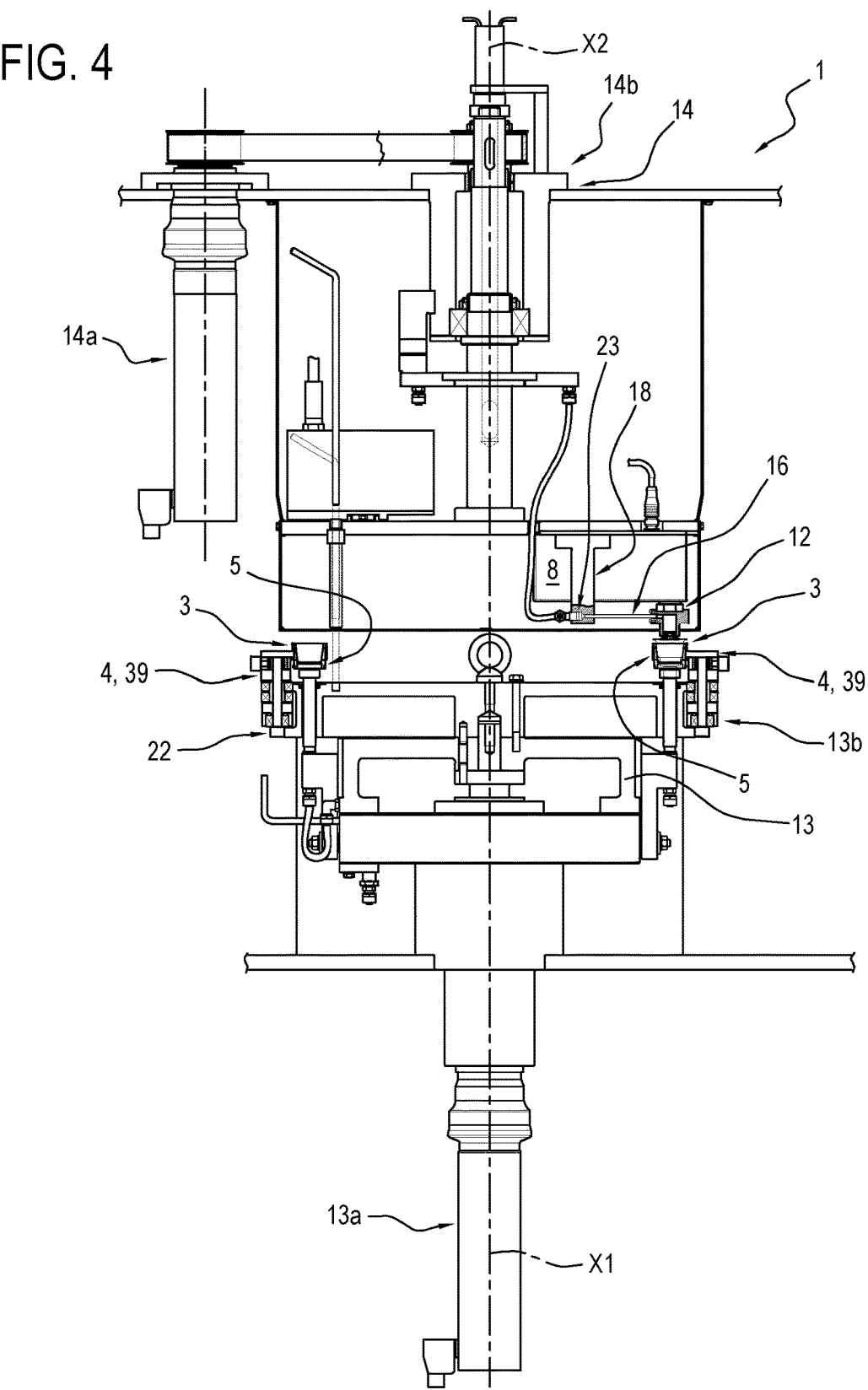
FIG. 4 illustrates a partial cross-section along the line IV-IV of FIG. 3.

More specifically, as illustrated in FIG. 2, the capsules 3 comprise, in a minimum but non-limiting configuration:
- a cup-shaped (rigid) container 2, usually of a truncated cone shape, having a base 30 and an upper opening 31 equipped with a collar 32;
- a dose 33 of product, contained inside the cup-shaped container 2;
- a lid 34 (or closing element 34) for closing the opening 31 of the cup-shaped container 2.

Preferably, the closing element 34 forms a hermetic closure of the cup-shaped container.

The capsule 3 may also comprise one or more filtering elements, not illustrated, of the rigid or flexible type.

A unit 1 for weighing cup-shaped containers filled and closed (to define capsules 3 for extraction or infusion beverages), forming part of a machine 100 for packaging capsules 3 for extraction or infusion beverages is described below.

The unit 1 for weighing containers 2 defining capsules 3 for extraction or infusion beverages for a packaging machine 100 comprises:
- a line 4 for transporting containers 2 extending along a first path P which passes through a region R1 for weighing and provided with a plurality of seats 5 for supporting the containers 2 arranged in succession along the first path P;
- elements 6 for vertical movement of the containers 2, each configured to make contact at the region R1 for weighing one of the containers 2 and moving it vertically so as to place it in a raised position PS1 disengaged from the corresponding supporting seat 5;
- elements 7 for retaining the containers 2, each designed to retain (suspended) one of the containers 2 in the raised position PS1;
- a plurality of weighing devices 8, each associated with, and carrying, one of the retaining elements 7 for weighing the container 2 retained by the retaining element 7.

According to the invention, the weighing devices 8 for are movable at least in the weighing region R1. Again according to the invention, the containers 2 are weighed in movement.

Preferably, the first path P is a closed path lying on a horizontal plane.

The supporting seats 5 are arranged one after another, not necessarily continuously.

In addition, the supporting seats 5 each have a corresponding vertical axis of extension. The seats 5 keep the axis of vertical extension along the first path P.

It should be noted that the transport line 4 comprises a transport element 39 to which the supporting seats 5 are connected to be moved along the first path P.

It should be noted that the transport element 39 is closed in a loop around movement means, which rotate about vertical axes, for moving the transport element 39.

Preferably, the transport element 39 is a chain comprising a plurality of links, hinged to one another in succession about corresponding vertical axes, to form an endless loop.

It should be noted that at least one of the links comprises at least one supporting seat 5 with a vertical axis for corresponding container 2 which can be positioned with the opening 31 facing upwards.

It should be noted that the chain may comprise both links having a corresponding supporting seat 5 and connecting links which are not provided with supporting seats 5 and which are interposed between links provided with supporting seats 5.

Therefore, preferably, each supporting seat 5 comprises a certain number of links.

Preferably, but not necessarily, the movement means of the transport element 39 rotate continuously about vertical axes to allow the transport element 39 to move continuously.

Preferably, the weighing unit 1 comprises a first movement element 13 to which are associated the vertical movement elements 6 for moving along a second path P2 which passes through the weighing region R1.

Preferably, the second path P2 is closed.

More preferably, the second path P2 is circular.

Preferably, the second path P2 comprises at least a horizontal stretch.

Preferably, the first movement element 13 comprises a first element 13b rotating about a respective axis X1 of rotation which supports the vertical movement elements 6.

Further, preferably, the first movement element 13 comprises a first drive unit 13a configured to rotate the first rotary element 13b.

Preferably, the first movement element 13 also comprises a crown gear 22 designed to mesh with the links of the chain of the transport element 39.

It should be noted that, preferably, the unit 1 also comprises a second movement element 14 to which are associated the retaining elements 7 for moving along a third path P3 which passes through the weighing region R1.

Preferably, the third path P3 is closed.

More preferably, the third path is circular.

Preferably, the third path P3 comprises at least a horizontal stretch.

Preferably, the third path P3 is at least partly superposed on the second path P2 in the weighing region R1.

According to another aspect of the invention, the second movement means 14 carries the weighing devices 8.

The second movement means 14 moves the weighing devices 8 at least to the weighing region R1.

Preferably, the second movement means 14 moves the weighing devices 8 along a fourth path P4. Preferably, the fourth path P4 is closed. More preferably, the fourth path P4 is circular.

Preferably, the fourth path P4 is horizontal.

The fourth path P4 is at least partly superposed on the second path P2 in the weighing region R1.

The fourth path P4 is at least partly superposed on the third path P3 in the weighing region R1.

Preferably, the second movement element 14 comprises a second element 14b rotating about a respective axis X2 of rotation and which supports the retaining elements 7 and the weighing devices 8.

Also, preferably, the second movement means 14 comprises a second drive unit 14a configured to rotate the second rotary element 14b.

Alternatively, in an embodiment not illustrated, the second drive unit 14a can be omitted and the first movement means 13 and the second movement means may be operated (preferably in rotation) by a single (first) drive unit 13a. In this embodiment, the single drive unit may be connected to the ground.

Preferably, the second rotary element 14b is positioned above the first rotary element 13b.

It should be noted that the first axis of rotation X1 and the second axis of rotation X2 are coincident.

According to another aspect, the elements 6 for vertical movement of the containers 2 comprise a plurality of lifting elements 6A, each designed to lift a container 2 and movable between a lower non-operating position PS2 (wherein the lifting element 6A does not comes into contact with the container 2) and an upper operating position PS3, wherein the container 2 (detected and supported by the lifting element 6A) is positioned in the raised position PS1.

More specifically, in the embodiment illustrated, the lifting elements 6A are designed to come into contact with the base 30 of the rigid, cup-shaped containers.

Advantageously, the lifting elements 6A may be sucked, in such a way as to keep the containers 2 particularly secure.

In short, the vertical movement elements 6 are movable vertically between the lower non-operating position PS2 and the upper operating position PS3, and rotate about the first axis of rotation X1.

Specific aspects of the retaining elements 7 will now be described in detail.

Each retaining element 7 comprises at least one suction device 9, connectable to a source of negative pressure (which does or does not form part of unit 1).

The retaining element 7 is designed to retain the containers 2 by suction.

More specifically, in the case of capsules 3, the retaining element 7 is designed to retain the capsules 3, at the closing element 34 or collar 32, by suction.

More specifically, each suction device 9 comprises:
a manifold 10;
a suction element, supported integrally by (fixed to) the manifold 10 and designed to retain the container 2;
a conduit 16 for the passage a fluid under negative pressure, in use operatively connected on one side to a source of negative pressure and on the other side to the manifold 10.

Advantageously, the suction element may comprise a suction cup 15.

Advantageously, the passage conduit 16 is a rigid conduit.

Each weighing device 8 comprises an active part 12, movable substantially linearly in a vertical direction, and a measurement part M, connected to the active part 12.

The active part 12 is integrally connected to the retaining element 7, in particular to the suction element, so that the active part 12 moves substantially linearly in a vertical direction as a function of the weight of a container (or of a generic object) fixed to the retaining element 7; the measurement part M provides a electrical signal representing the vertical movement of the active part 12 and therefore of the weight of the container fixed to the retaining element 7, in particular to the suction element.

It should be noted that, preferably, the measuring part M also comprises a conditioning signal of the electrical circuit.

In other words, the movable active part 12 and the measurement part M define to all intents and purposes a weighing sensor.

Advantageously, a weighing device 8 may be used based on the principle of electromagnetic compensation of the force.

More specifically, the manifold 10 is fixed to the active part 12 of the weighing device 8, in such a way that it can be moved as one with the active part 12.

Preferably, the conduit 16 is positioned radially relative to the axis X2 of rotation of the second rotary element 14.

According to the drawings, the machine 1 comprises, for each retaining element 7 (that is, suction device 9), an element 18 for supporting the conduit 16, designed to support the conduit 16 in a predetermined position relative to the weighing device 8.

More specifically, it should be noted that the supporting element 18 is rigidly fixed to the second rotary element 14b and supports the conduit 16 in a predetermined position relative to the weighing device 8.

More specifically, the supporting element 18 is equipped with a housing seat 23, configured for housing inside it a first end of the conduit 16.

The supporting element 18 is, preferably, a rigid type element.

The manifold 10 has, preferably, an opening 19 for housing the conduit 16.

Preferably, the housing opening 19 is designed to house a second end of the conduit 16. In short, the first end of the conduit 16 is housed in the housing seat 23 of the supporting element 18, whilst the second end of the conduit 16 is housed in the housing opening 19 of the manifold 10.

Preferably, the conduit 16 is housed with clearance inside the housing opening 19.

In other words, the size of the housing opening 19 is such as to prevent contact with the conduit 16 when the container 2 is fixed to the suction cup 15.

Moreover, advantageously, the size of the housing opening 19 is such as to prevent contact with the conduit 16 also when the container 2 is not fixed to the suction cup 15, that is, during the non-weighing step.

When the container 2 is fixed to, and retained by, the suction cup 15, it is in a hanging position (suspended), that is, without lower support;

moreover, the manifold 10 and the active part 12 of the weighing device 8 are moved—relative to the normal equilibrium position—by the action of the weight of the container 2, whilst the conduit 16 keeps unchanged its relative position: the size of the housing opening 19 is such as to prevent contact with the conduit 16 following the above-mentioned movement of the manifold 10 determined by the weight of the container 2.

It should be noted that, advantageously, in this way, by preventing contact of the conduit 16 with the opening 19, the weight measurement is particularly repeatable, that is, reliable, since it is in no way influenced by force components which might be established following contact between walls of the conduit 16 and walls of the opening 19.

It should also be noted that, preferably, the suction device 9 comprises a plate 20 defining a opening 21 for passage of the conduit 16. The plate 20 is coupled to (fixed to) the manifold 10.

More specifically, the plate 20 is fixed to the manifold 10 in such a way that the opening 21 of the plate 20 (indicated in a dashed line in FIG. 6A) faces the opening 19 of the manifold 10.

Figure 6A:
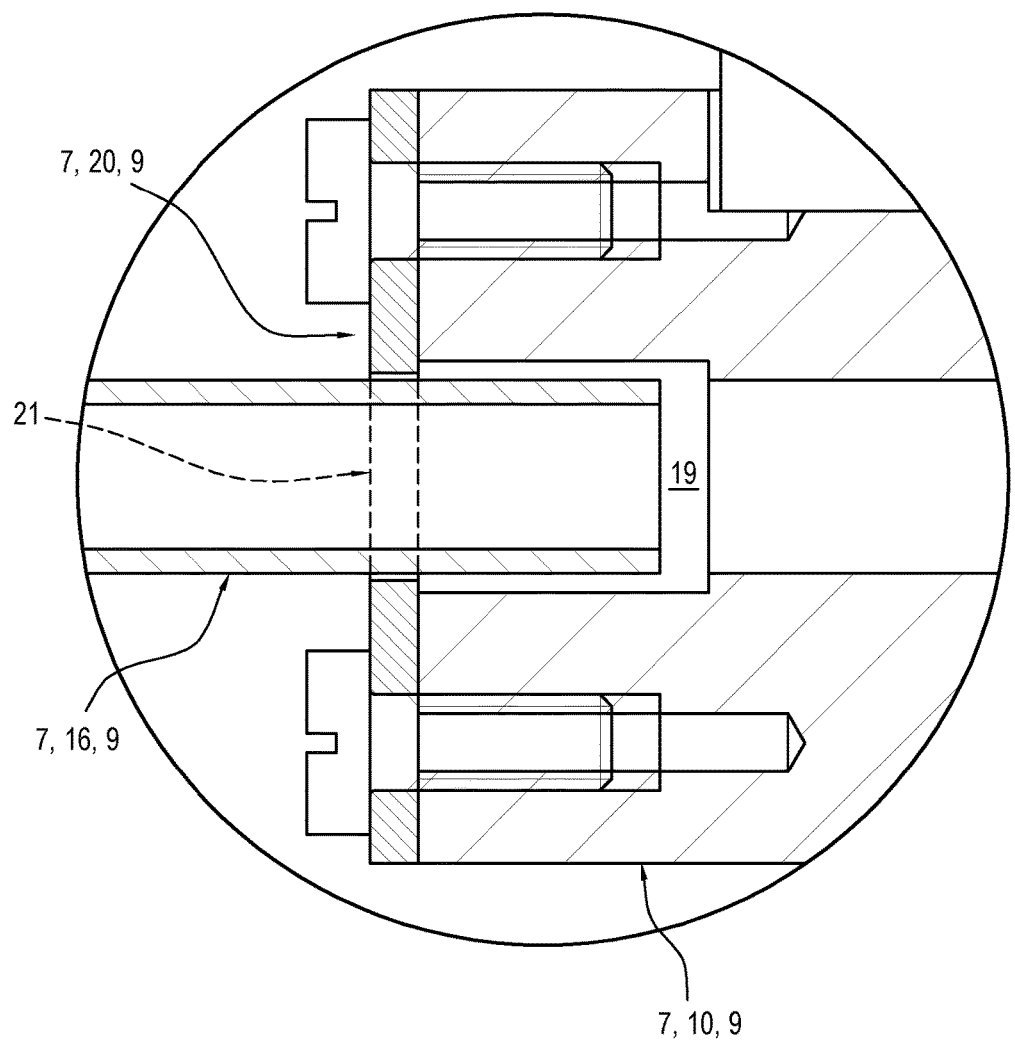
FIGS. 6A and 6B illustrate respective details in enlarged scale of the weighing unit according to the invention.
Figure 6B:
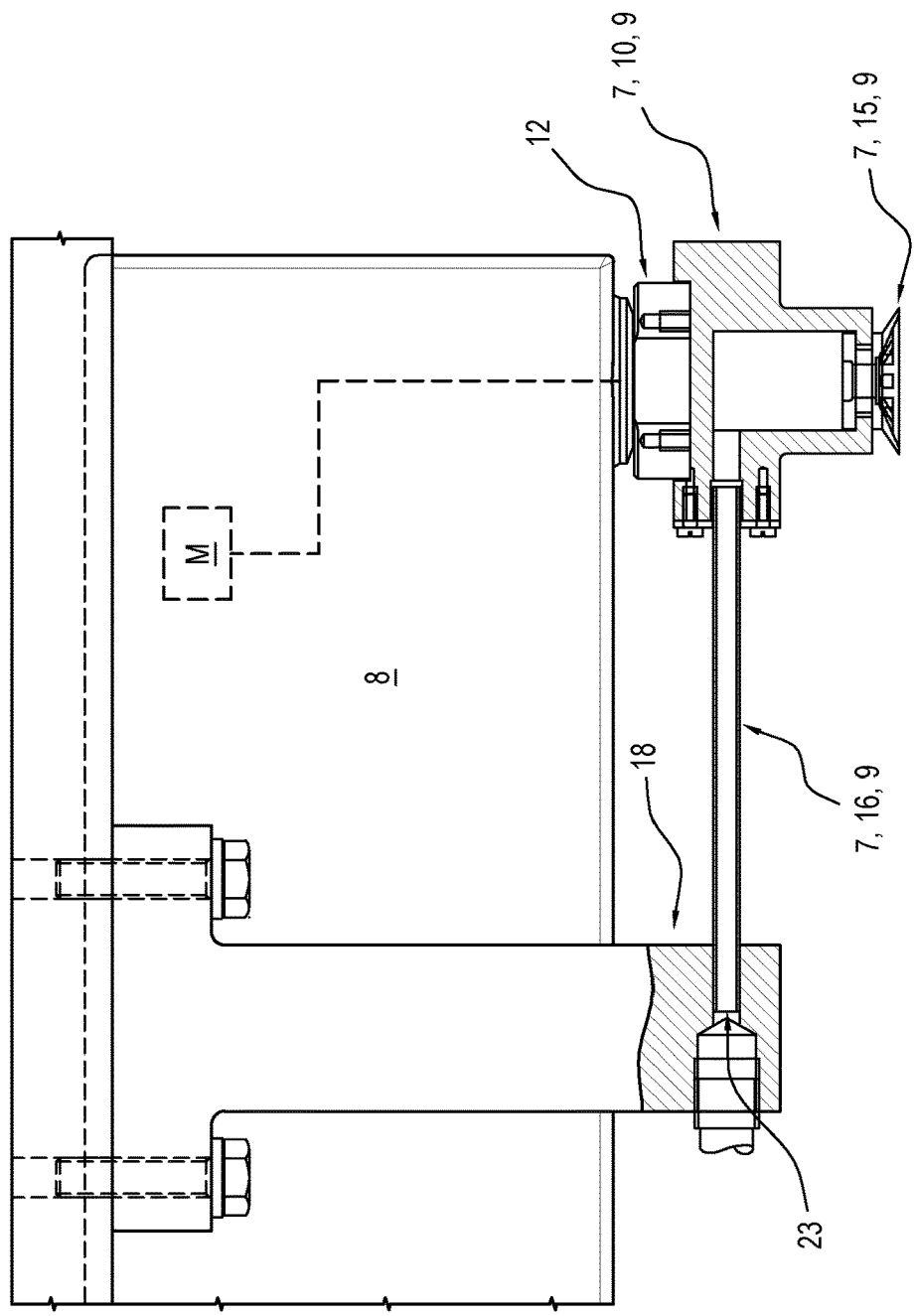
Figure 11:
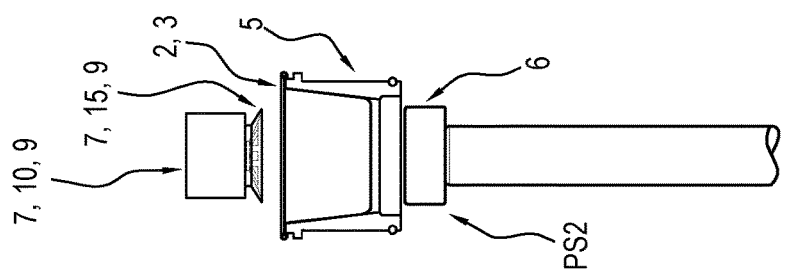
FIGS. 7 to 11 illustrate respective schematic views of the weighing unit according to this invention during a weighing cycle in different operational steps.
Figure 10:
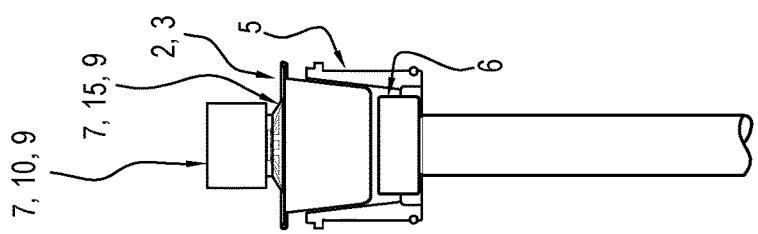

According to this aspect, preferably, the opening 21 has a gap (area) smaller than the opening 19 for housing the conduit 16 (as is evident from FIG. 6A).

The opening 21 allows the negative pressure to be maintained when activated inside the manifold 10, that is, on the suction cup 15.

It should also be noted that preferably, the opening 21 is sized to prevent contact with the conduit 16 both when the container 2 is fixed and when it is not fixed to the suction cup 15 (to achieve the technical effect of increasing the reliability of the measurement, already described above with reference to the sizing of the opening 19).

The plate 20 is not necessary, but is advantageous to reduce the head losses and increase the degree of negative pressure at the suction cup 15.

Alternatively, in embodiments not illustrated, the suction cup 15 may be replaced by a suction mouth, or opening.

Moreover, the retaining elements may comprise, instead of or in addition to the suction device 9, pick-up grippers or similar gripping devices. In other alternative embodiments not illustrated, the conduit 16 can be made with a flexible hose and mounted in a sealed fashion (therefore without clearance) at the supporting element 18 and the manifold 10, or the conduit 16 can be made with a rigid pipe (as in the embodiment illustrated) and mounted in a sealed fashion using elastic, or flexible, seals at the supporting element 18 and the manifold 10.

According to another aspect, the unit 1 comprises a drive and control unit 25 configured to control the first drive unit 13a and the second drive unit 14a so as to move in synchrony and in phase relationship the first movement element 13 and the second movement element 14, to move the weighing devices 8, the retaining elements 7 and the vertical movement elements 6 in a predetermined phase relationship with the supporting seats 5 (as described in more detail below).

The operation of the weighing unit 1 is briefly described below with reference to the weighing of a container 2, from which further technical—functional aspects and advantages of the invention may be inferred.

The sequence of weighing a container 2 is illustrated in FIGS. 7 to 11.

The container 2 (closed and filled with product to define a capsule 3) is transported by the transport line 4 to the weighing unit 1, that is, to the weighing region R1.

At the weighing region R1, the container 2 is superposed on a vertical movement element 6 and positioned below a retaining element 7 and associated with the weighing device 8.

It should be noted that, for a portion (preferably curved, more preferably an arc of a circle) of the first path P of the container 2, the container 2, a vertical movement element 6, and a retaining element 7 are substantially aligned vertically.

The above-mentioned vertical superposing is maintained in the weighing region R1 to allow the weighing to be performed.

More specifically, preferably, the element 6 for vertical movement is positioned below the seats 5.

On the other hand, preferably the retaining elements 7 and the weighing devices 8 are located above the seats 5.

Figure 9:
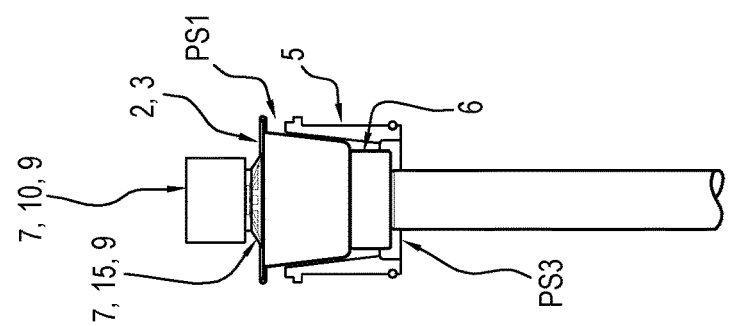
Figure 8:
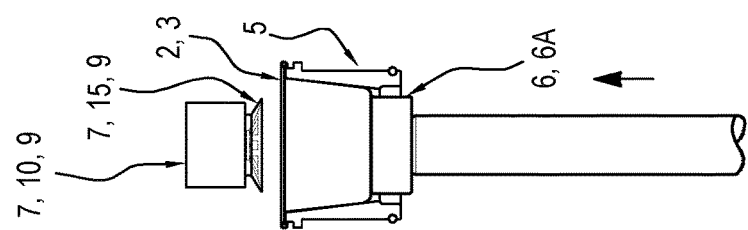
Figure 7:
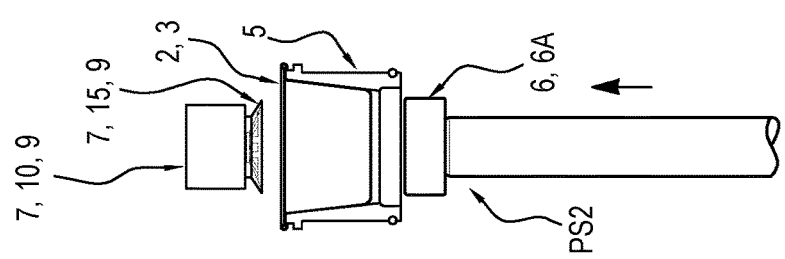

During the movement of the container 2 to the weighing region R1 passed through by the first path P, the vertical movement element 6 is moved vertically, so as to make contact below with the container 2 (as illustrated in FIG. 8) and lift the container 2 in order to detach it from the relative containment seat 5 (as illustrated in FIG. 9).

Advantageously, whilst the container 2 is lifted, it is retained by suction by the movement element 6.

It should be noted that the container 2 is raised until making contact with the suction cup 15 (FIG. 9): in this raised position PS1 of the container 2 the source of negative pressure is activated, so that the container 2 can be retained by the suction cup 15.

Advantageously, in the case wherein the container 2 is defined by a capsule 3 as above illustrated, the suction cup 15 comes into contact with the capsule 3 at the closing element 34, or the collar 32.

It is also should be noted that, preferably, the vertical movement element 6, after moving the container 2 into contact with the suction cup 15 (FIG. 9), is moved downwards (for a predetermined stroke) until detaching from the container 2 (FIG. 10), leaving the container 2 hanging on the retaining element 7, in particular the suction cup 15, free from lower supports.

If the vertical movement element 6 is also of the suction type, that is, in the preferred embodiment wherein the lifting elements 6A are sucked, the suctions of the suction cup 15 and of the movement element 6 are synchronised, in such a way that, once the container 2 has been received by the suction cup 15, the suction of the movement element 6 is interrupted and the movement element 6 may lower without dragging behind the container 2 which must be weighed.

Once the container 2 has been weighed, the movement element 6 is again lifted to make contact with the container 2 (and, if necessary, held by suction if the movement element 6 is of the suction type); substantially simultaneously, the suction of the suction cup 15 is interrupted to leave the container 2 being delivered to the movement element 6 to be returned to the respective supporting seat 5.

It should be noted that, advantageously, as described in more detail below, the fact of weighing the container 2 free from lower supports means that the measurement is particularly accurate and repeatable.

At this point, in order to weigh the container 2 which is attached to the suction cup 15, the suction cup 15, the manifold 10 and the active part 12 of the weighing device 8, which are fixed to each other, move (downwards) relative to their position of equilibrium, in such a way that the measurement part M connected to the active part 12 of the device can generate a signal representing the weight of the container 2 (or, more generally speaking, of the container or the object attached to the retaining element 7).

In this way, advantageously, the container 2 is weighed.

It should be noted that during weighing, the weighing device 8, in particular the measurement part M, is moved on a horizontal plane.

More specifically, the weighing device 8, in particular the measurement part M, is moved along a circular trajectory lying on a horizontal plane.

In other words, in order to perform the weighing, the weighing device 8, in particular the measurement part M, is not moved vertically, in particular towards (or away from) the container 2 to be weighed, but remains positioned at a same height, with advantages in terms of measuring accuracy and precision.

It should be noted that, once the weighing has been completed, the vertical movement element 6 is again raised until making contact with the container 2, and the source of negative pressure ceases to be active on the suction cup 15, to allow release of the container 2.

The movement of the element 6 for vertical movement from the raised operating position PS3 to the lower non-operating position PS2 means that the container 2 is moved inside the relative underlying seat 5.

It should be noted that the steps described above are performed substantially continuously, that is to say without stopping the transport line 4.

In other words, the transport line 4 is actuated continuously and the weighing is performed with the container 2 moving along a trajectory superposed on the first path P.

For this reason, in order to perform the weighing, the container 2 is moved simultaneously vertically and, according to a plan view, along a path superposed over the first path P.

In this way, advantageously, during the execution of the above-mentioned steps, the container 2, the respective seat 5, the weighing device 8, the retaining element 7 and the vertical movement element 6 are moved in synchrony, so as o keep unaltered the relative positions projected in plan.

It should be noted that during the weighing, the transport line 4 could be stationary, that is, not driven (in which case a weighing would be performed with the container 2 in a predetermined position on the first path P).

According to this aspect, the transport line 4 could be driven in step mode.

It should be noted that, advantageously, according to the latter aspect, the container 2 may be weighed without the container being moved laterally relative to the first path P (as in other prior art systems), because the container 2 is only moved vertically for the purposes of weighing.

Advantageously, regardless of the means for driving the transport line 4 (continuous or intermittent), the weighing unit allows a weighing to be performed with a vertical stroke which is particularly reduced and therefore very quick.

It should also be noted that the overall dimensions of the weighing unit 1 are particularly reduced, thanks to the placing of the weighing device 8 substantially above the container to be weighed.

Moreover, it should also be noted that during the weighing, the weighing device 8 (in particular the measurement part M) is not moved along the vertical direction of movement of the active part 12, with obvious advantages in terms of precision and accuracy of the measurement.

It should also be noted that, preferably, the first rotary element 13b and the second rotary element 14b are mechanically independent of each other (separate).

In other words, the first drive unit 13a is independent of the second drive unit 14a, and moreover, preferably, the supporting frame of the first rotary element 13b is different, and separate, from the frame for supporting the second rotary element 14b.

The supporting frame of the second rotary element 14b may advantageously be connected directly to the ground.

It should be noted that the fact of having mechanically separated the second rotary element 14b from the first rotary element 13b (and in particular from the ring gear 22 for meshing supported by the first rotary element 13b) means that the vibrations due to the operation of the transport element 39 are not transmitted to the second rotary element 14b (where the weighing devices 8 are positioned), thereby increasing the overall reliability of the measurement which is therefore performed substantially in the absence of vibrations.

It should be noted that in the embodiment illustrated the first drive unit 13a is located beneath the containers 2 to be weighed and the second drive unit 14a is located above the containers 2 to be weighed and above the weighing devices 8. In alternative embodiments not illustrated, the first drive unit 13a and the second drive unit 14a may be located in opposite positions, or located both above, or under, the containers 2 to be weighed.

Also defined is a packaging machine 100 comprising a plurality of stations, positioned along the first path P performed by the transport element 39, configured to operate in a synchronised fashion (preferably continuously) with the transport element 39, comprising at least:
 a station SA for feeding the containers 2 into corresponding seats 5 of the transport element 39;
 a station SR for filling the containers 2 with product;
 a station SC for closing the containers 2;
 a station SP for weighing the containers 2 (comprising the closing unit 1 described above);
 an outfeed station SU which picks up the containers 2 from the respective seats 5 of the transport element 39.

In addition to the stations listed above, the packaging machine 100 may comprise further stations, such as, for example, one or more cleaning stations, one or more control stations and, in the case of packaging machines for capsules, depending on the type of capsule to be packaged, one or more stations for applying filtering elements.

According to the invention, a method is also defined for weighing containers 2 (in particular containers 2 defining capsules 3 for extraction or infusion beverages).

The method comprises the following steps:
 moving a plurality of containers 2 housed in respective supporting seats 5 movable along a first path P;
 lifting in a weighing region R1 a container 2 and detaching the container 2 from a corresponding supporting seat 5;
 delivering, at the weighing region R1, the container 2 to a retaining element 7 associated with, and carried by, a weighing device 8, the retaining element 7 making contact with and holding the container 2 from above, in such a way that the container 2 is free from lower supports;
 keeping lifted, held by the retaining element 7, the container 2 and simultaneously weighing the container 2 by means of the weighing device 8 at the weighing region R1.

It should be noted that, according to the invention, the step of weighing the container 2 comprises a step of moving the container 2 and the weighing device 8.

Advantageously, the step of weighing the container 2 comprises a step of moving horizontally the container 2 and the weighing device 8.

Preferably, in the weighing region R1, the container 2 is moved along a path superposed on a portion of the first path P.

It should be noted that, in this way, the unit 1 allows the weighing to be performed in a particularly quick manner because the container 2 is not stopped and the weighing is performed in movement along a path substantially superposed on the first path P.

Advantageously, during the weighing step, the container 2 can perform an actual trajectory in space, that is, may have, as well as a horizontal component, also a vertical component, substantially due to the vertical movement of the active part 12, therefore of the retaining element 7 to which the container 2 is connected.

Preferably, the entire weighing step occurs with the container 2 and the weighing device 8 in movement.

Preferably, the weighing step comprises a step of moving the container 2 and the device weighing 8 along a curvilinear path.

According to another aspect, preferably the step of lifting the container 2 at the weighing region comprises a step of making contact below the container 2 using a vertical movement element 6 (mobile vertically) and a step of moving the vertical movement element 6 upwards to detach the container 2 from the corresponding supporting seat 5.

According to yet another aspect, the step of moving the vertical movement element 6 upwards to detach the container 2 from the corresponding supporting seat 5 comprises a step of moving the vertical movement element 6 from a lower position PS2, wherein the container 2 is resting on the corresponding supporting seat 5, to an upper position PS3, wherein the container 2 is moved into contact with a retaining device 7.

Preferably, the step of keeping lifted the container 2 comprises a step of applying a negative pressure to at least a portion of the upper surface of the container 2. More in detail, the step of keeping lifted the container 2 comprises retaining the container 2 by suction by means of the retaining devices 7.

If the containers 2 define capsules 3 of the type previously illustrated, the step of retaining by suction is performed at the closing element 34.

According to yet another aspect, the above-mentioned steps of lifting a container 2 at the weighing region, keeping the container 2 raised and simultaneously weighing the container 2 are performed at the same time (simultaneously) as the step for moving the plurality of containers 2.

According to one aspect, during the weighing step, the container 2 is moved along the first path P.

Alternatively, during the weighing step, the container 2 is stationary along the first path P.

According to another aspect, the lifting step is performed by means of movement elements 6, the method comprising a step of moving the movement elements 6 to a weighing region R1 along a second path P2 at least partly superposed on the first path P; the method also comprising a step of moving the retaining element 7 to the weighing region R1 along a third path P3 at least partly superposed on the second path P2.

Preferably, the second path is closed. Preferably, the third path P3 is closed.

According to yet another aspect, the step of moving the retaining element 7 comprises rotating the retaining element 7 about a vertical axis of rotation.

According to a further aspect, the method comprises a step of moving the weighing device 8 on a horizontal plane.

Preferably, the step of moving the weighing device 8 comprises rotating the weighing device 8 about a vertical axis of rotation.

Advantageously, the unit 1 allows containers 2 to be weighed in a particularly easy, quick and reliable manner.

The operating speed which may be reached by the packaging machine 100 with the unit 1 according to the invention is therefore particularly high.

The method according to this invention, as illustrated with reference to containers 2, may advantageously be performed on objects to be weighed in general, in particular objects designed to be housed in corresponding supporting seats and to be retained (suspended) by retaining elements associated with measuring devices.

The invention claimed is:

1. A weighing unit for weighing containers comprising:
   a line for transporting containers extending along a first movement path which passes through a region for weighing and provided with a plurality of seats for supporting the containers arranged in succession along the first path;
   a plurality of vertical movement elements, each configured to make contact with and move vertically to the weighing region a container, thereby placing it in a raised position disengaged from a corresponding supporting seat;
   a plurality of retaining elements, each designed for holding a container in the raised position, in such a way that the container is held by a respective retaining element and free from lower supports;
   a plurality of weighing devices, each associated with, and carrying, one of the retaining elements for weighing a container held by the retaining element, the weighing devices being movable at least in the weighing region; and
   a first movement element to which are associated the vertical movement elements for moving along a second path which passes through the weighing region.

2. The weighing unit according to claim 1, comprising a second movement element to which are associated the retaining elements, the second movement element moving the retaining elements along a third path which passes through the weighing region, the third path being at least partly superposed on the second path at the weighing region.

3. The weighing unit according to claim 2, wherein the weighing devices are associated with the second movement element, the second movement element moving the weighing devices along a fourth path at least partly superposed on the second path at the weighing region.

4. The weighing unit according to claim 1, wherein the first movement element and the second movement element are mechanically independent of each other.

5. The weighing unit according to claim 1, wherein the vertical movement elements comprise a plurality of lifting elements, each designed to lift a respective container and movable between a lower non-operating position and an upper operating position, wherein the respective container is positioned in the raised position.

6. The weighing unit according to claim 1, wherein each retaining element comprises at least one suction device, connected to a source of negative pressure.

7. The weighing unit according to claim 6, wherein each weighing device comprises a movable active part and a measuring part designed for generating an electrical signal representing the weight of the container depending on a movement of the active part, and wherein the suction device comprises:
   a manifold, fixed to the active part of the weighing device,
   a suction cup, carried by the manifold and designed to retain the container,
   a conduit for the passage a fluid under negative pressure, in use operatively connected at a first end to a source of negative pressure and at a second end to the manifold.

8. The weighing unit according to claim 7, comprising, for each suction device, an element for supporting the conduit, designed to support the conduit in a predetermined position relative to the weighing device, and wherein the manifold has an opening for housing the second end of the conduit having dimensions such as to prevent contact between the manifold and the conduit when the container is fixed to the suction cup.

9. The weighing unit according to claim 8, wherein the suction device comprises a plate defining an opening for passage of the conduit, the passage opening having a gap beneath the opening for housing the manifold and also being sized to prevent contact between the plate and the conduit when the container is fixed to the suction cup.

10. The weighing unit according to claim 1, wherein:
    the first movement element comprises a first unit rotating about a respective axis of rotation and which supports the vertical movement elements, and a first drive unit designed to rotate the first rotary unit;
    the second movement element comprises a second unit rotating about a respective axis of rotation and which supports the weighing devices and the retaining elements, and a first second unit designed to rotate the second rotary unit;
    the weighing unit comprising a drive and control unit configured to control the first drive unit and the second drive unit so as to move in synchrony and in phase relationship the first movement element and the second movement element, to move the weighing devices, the retaining elements and the vertical movement elements in a predetermined phase relationship with the supporting seats in the weighing region.

11. A method for weighing containers comprising using the weighing unit of claim 1 to perform the following steps:
moving a plurality of containers housed in respective supporting seats along the first path;
lifting in the weighing region a container and detaching the container from a corresponding supporting seat;
delivering, at the weighing region, the container to the retaining element associated with, and carried by, the weighing device, the retaining element making contact with and holding the container from above, in such a way that the container is free from lower supports;
keeping lifted, held by the retaining element, the container and simultaneously weighing the container by means of the weighing device at the weighing region,
and wherein the step of weighing the container comprises a step of moving the container and the weighing device.

12. The method according to claim 11, comprising a step of horizontally moving the weighing device.

13. The method according to claim 12, wherein the step of keeping lifted the container comprises retaining the container by suction by means of the retaining element.

14. The method according to claim 11, wherein the weighing step comprises a step of moving the container along a path superposed on a portion of the first path.

15. The method according to claim 11, wherein the lifting step is performed by means of the vertical movement elements, the method comprising a step of moving the vertical movement elements to the weighing region along a second closed path at least partly superposed on the first path; the method also comprising a step of moving the retaining element to the weighing region along a third closed path at least partly superposed on the second path.

16. The method according to claim 15, wherein the step of moving the retaining element comprises rotating the retaining element about a vertical axis of rotation.

17. The method according to claim 11, wherein the step of weighing the container comprises a step of rotating the weighing device about a vertical axis of rotation.

* * * * *